US012506309B2

(12) United States Patent
Chang et al.

(10) Patent No.: US 12,506,309 B2
(45) Date of Patent: Dec. 23, 2025

(54) JUNCTION CONNECTOR FOR MODULAR DONGLE ASSEMBLY

(71) Applicant: Dell Products L.P., Round Rock, TX (US)

(72) Inventors: Yaotsung Chang, Taipei (TW); Hou-Chun Wang, New Taipei (TW); Tsan-Wei Liu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 354 days.

(21) Appl. No.: 18/332,829

(22) Filed: Jun. 12, 2023

(65) Prior Publication Data

US 2024/0413599 A1 Dec. 12, 2024

(51) Int. Cl.

| | |
|---|---|
| ***H01R 31/06*** | (2006.01) |
| ***H01R 13/62*** | (2006.01) |
| ***H01R 31/00*** | (2006.01) |
| *H01R 107/00* | (2006.01) |

(52) U.S. Cl.

CPC ......... *H01R 31/06* (2013.01); *H01R 13/6205* (2013.01); *H01R 31/005* (2013.01); *H01R 2107/00* (2013.01)

(58) Field of Classification Search

CPC .. H01R 31/06; H01R 31/005; H01R 13/6205; H01R 2107/00

See application file for complete search history.

(56) References Cited

U.S. PATENT DOCUMENTS

| | | | | |
|---|---|---|---|---|
| 6,394,813 | B1 * | 5/2002 | Stout | H01R 35/00 439/11 |
| 6,733,329 | B2 * | 5/2004 | Yang | H01R 31/065 439/518 |
| 8,251,723 | B2 * | 8/2012 | Tsai | H01R 24/38 439/108 |
| 9,356,370 | B2 * | 5/2016 | Lee | H01R 13/658 |
| 9,362,664 | B2 * | 6/2016 | Yen | H01R 13/6205 |
| 9,543,722 | B2 * | 1/2017 | Kato | H01R 31/06 |
| 9,746,881 | B2 * | 8/2017 | Owens, Jr. | H01R 31/06 |
| 9,899,753 | B1 * | 2/2018 | Chiang | H01R 4/54 |
| 9,991,628 | B2 * | 6/2018 | Daoura | H01R 13/6205 |
| 9,991,657 | B2 * | 6/2018 | Powers | H01R 31/06 |
| 10,038,288 | B2 * | 7/2018 | Choi | H01R 13/22 |
| 10,181,690 | B1 * | 1/2019 | Brennan, Jr. | H01R 13/04 |

(Continued)

*Primary Examiner* — Thanh Tam T Le

(74) *Attorney, Agent, or Firm* — McDermott Will & Schulte LLP

(57) ABSTRACT

An assembly, comprising a junction connector, including: a circuit board connector positioned on a first side of the junction connector; a plurality of spring loaded pins positioned on a second side of the junction connector, the second side opposite to the first side, wherein the circuit board connector is connected to the plurality of spring loaded pins; a dongle, including: an external port positioned on a first side of the dongle; and a connector pad positioned on a second side of the dongle, wherein the external port is connected to the connector pad, wherein the dongle is coupled to the junction connector such that the connector pad of the dongle is connected to the plurality of spring loaded pins of the junction connector, wherein the circuit board connector of the junction connector is configured to be coupled with a socket of an information handling system.

19 Claims, 9 Drawing Sheets

(56) References Cited

U.S. PATENT DOCUMENTS

| | | | | |
|---|---|---|---|---|
| 10,594,099 | B2 * | 3/2020 | Harley | H01R 13/6273 |
| 10,944,226 | B2 * | 3/2021 | Justin | H01R 31/06 |
| 11,189,965 | B2 * | 11/2021 | Youn | H01R 24/62 |
| 11,509,092 | B2 * | 11/2022 | Yang | H01R 31/06 |
| 11,799,254 | B2 * | 10/2023 | Zhang | H01R 24/68 |
| 11,962,115 | B2 * | 4/2024 | Feng | H01R 13/6658 |
| 2016/0211609 | A1 * | 7/2016 | Sorias | H01R 13/6205 |

* cited by examiner

JUNCTION CONNECTOR FOR MODULAR DONGLE ASSEMBLY

BACKGROUND

Field of the Disclosure

The disclosure relates generally to a junction connector for modular dongle assembly for an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in an assembly, including a junction connector, including: a circuit board connector positioned on a first side of the junction connector; a plurality of spring loaded pins positioned on a second side of the junction connector, the second side opposite to the first side, wherein the circuit board connector is connected to the plurality of spring loaded pins; a dongle, including: an external port positioned on a first side of the dongle; and a connector pad positioned on a second side of the dongle, wherein the external port is connected to the connector pad, wherein the dongle is coupled to the junction connector such that the connector pad of the dongle is connected to the plurality of spring loaded pins of the junction connector, wherein the circuit board connector of the junction connector is configured to be coupled with a socket of an information handling system.

Other embodiments of these aspects include corresponding systems and apparatus.

These and other embodiments may each optionally include one or more of the following features. For instance, the junction connector includes a first magnetic coupling interface at the second side of the junction connector; and the dongle includes a second magnetic coupling interface at the second side of the dongle, wherein the dongle is coupled to the junction connector such that the first magnetic coupling interface of the junction connector is coupled with the second magnetic coupling interface of the dongle. The first magnetic coupling interface of the junction connector is coupled with the second magnetic coupling interface of the dongle to maintain a positioning of the dongle with respect to the junction connector. The dongle includes a plurality of spring loaded pins positioned on a third side of the dongle, the plurality of spring loaded pins of the dongle connected to the connector pad of the dongle. Further including an additional dongle, including: an additional external port positioned on a first side of the additional dongle; and an additional connector pad positioned on a fourth side of the additional dongle, wherein the additional external port is connected to the additional connector pad. The additional dongle is coupled to the dongle such that the additional connector pad of the additional dongle is connected to the plurality of spring loaded pins of the dongle. The dongle includes a third magnetic coupling interface positioned on the third side of the dongle; and the additional dongle includes a fourth magnetic coupling interface positioned on the fourth side of the additional dongle, wherein the additional dongle is coupled to the dongle such that the third magnetic coupling interface of the dongle is coupled with the fourth magnetic coupling interface of the additional dongle. The dongle includes an additional connector pad positioned on a fourth side of the dongle, the additional connector pad of the dongle connected to the connector pad of the dongle. Further including an additional dongle, including: an additional external port positioned on a first side of the additional dongle; and an additional plurality of spring loaded pins positioned on a third side of the additional dongle, wherein the additional external port is connected to the additional plurality of spring loaded pins. The additional dongle is coupled to the dongle such that the additional plurality of spring loaded pins of the additional dongle is connected to the additional connector pad of the dongle. The dongle includes a fifth magnetic coupling interface positioned on the fourth side of the dongle; and the additional dongle includes a sixth magnetic coupling interface positioned on the third side of the additional dongle, wherein the additional dongle is coupled to the dongle such that the fifth magnetic coupling interface of the dongle is coupled with the sixth magnetic coupling interface of the additional dongle. The external port of the dongle is a high-definition multimedia interface (HDMI) port. The external port of the dongle is an universal serial bus (USB) port. The external port of the dongle is a secure digital (SD) port. The socket of the information handling system is a zero insertion force (ZIF) socket.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
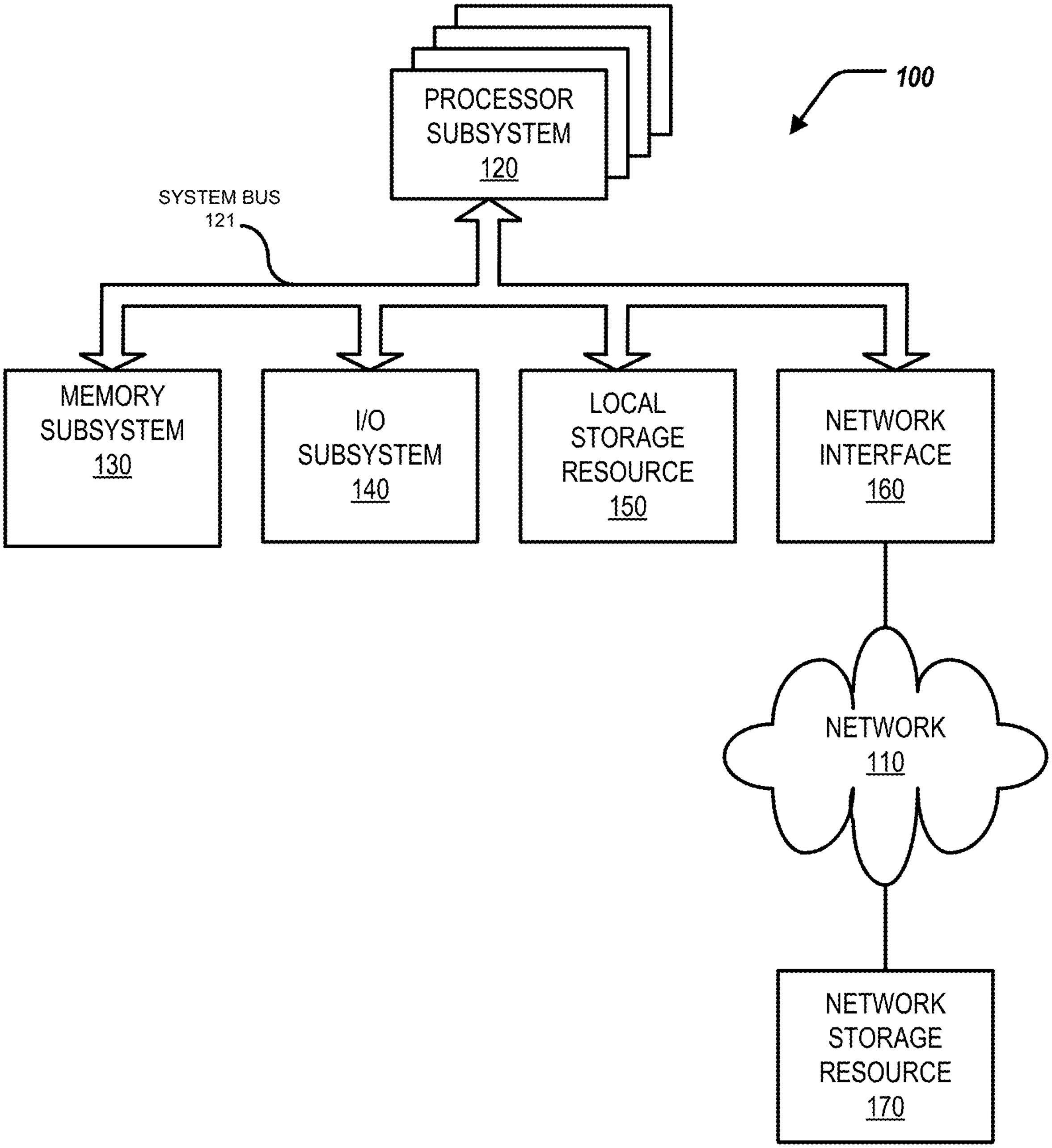
FIG. 1 is a block diagram of selected elements of an embodiment of an information handling system.

This disclosure discusses a junction connector for modular dongle assembly for an information handling system. In short, a dongle can be connected to the information handling system utilizing a junction connector. The junction connector can connect to the dongle via spring loaded pins and a connector pad. Additional dongles can be connected to the junction connector, and ultimately, the information handling system, thru the previously connected dongle.

Specifically, this disclosure discusses an assembly, including a junction connector, including: a circuit board connector positioned on a first side of the junction connector; a plurality of spring loaded pins positioned on a second side of the junction connector, the second side opposite to the first side, wherein the circuit board connector is connected to the plurality of spring loaded pins; a dongle, including: an external port positioned on a first side of the dongle; and a connector pad positioned on a second side of the dongle, wherein the external port is connected to the connector pad, wherein the dongle is coupled to the junction connector such that the connector pad of the dongle is connected to the plurality of spring loaded pins of the junction connector, wherein the circuit board connector of the junction connector is configured to be coupled with a socket of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, a dongle can be connected to the information handling system 100 utilizing a junction connector. The junction connector can connect to the dongle via spring loaded pins and a connector pad. Additional dongles can be connected to the junction connector, and ultimately, the information handling system 100, thru the previously connected dongle.

Figure 2:
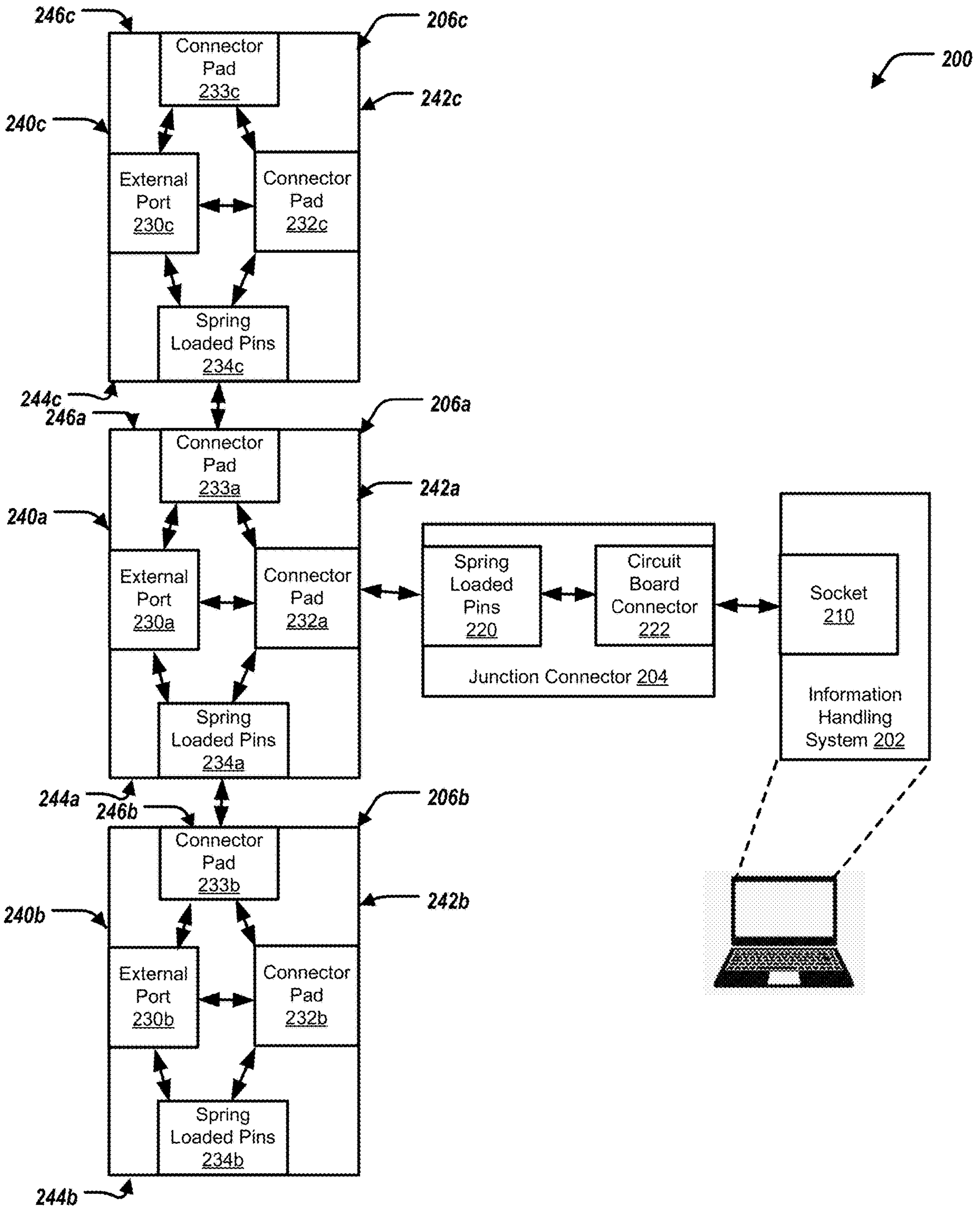
FIG. 2 illustrates a block diagram of a computing environment including an information handling system, a junction connector, and dongles.

Turning to FIG. 2, FIG. 2 illustrates an environment 200 including an information handling system 202, a junction connector 204, a first dongle 206*a*, a second dongle 206*b*, and a third dongle 206*b* (collectively referred to as dongles 206). The information handling system 202 can include a socket 210. In some examples, the information handling system 202 is similar to, or includes, the information handling system 100 of FIG. 1.

The junction connector 204 can include a plurality of spring loaded pins 220 and a circuit board connector 222.

The first dongle 206*a* can include a first external port 230*a*, a first connector pad 232*a*, a first additional connector pad 233*a*, and a first plurality of spring loaded pins 234*a*. The first external port 230*a* is positioned on a first side 240*a* of the first dongle 206*a*; the first connector pad 232*a* is positioned on a second side 242*a* of the first dongle 206*a*; the first plurality of spring loaded pins 234*a* are positioned on a third side 244*a* of the first dongle 206*a*; and the first additional connector pad 233*a* is positioned on a fourth side 246*a* of the first dongle 206*a*. The first connector pad 232*a* can be in communication with (connected with) the first additional connector pad 233*a*, the first external port 230*a*, and the first plurality of spring loaded pins 234*a*. The first external port 230*a* can be in communication with (connected with) the first additional connector pad 233*a*. The first external port 230*a* can be in communication with (connected with) the spring loaded pins 234*a*.

The second dongle 206*b* can include a second external port 230*b*, a second connector pad 232*b*, a second additional connector pad 233*b*, and a second plurality of spring loaded pins 234*b*. The second external port 230*b* is positioned on a first side 240*b* of the second dongle 206*b*; the second connector pad 232*b* is positioned on a second side 242*b* of the second dongle 206*b*; the second plurality of spring loaded pins 234*b* are positioned on a third side 244*b* of the second dongle 206*b*; and the second additional connector pad 233*b* is positioned on a fourth side 246*b* of the second dongle 206*b*. The second connector pad 232*b* can be in communication with (connected with) the second additional connector pad 233*b*, the second external port 230*b*, and the second plurality of spring loaded pins 234*b*. The second external port 230*b* can be in communication with (connected with) the second additional connector pad 233*b*. The second external port 230*b* can be in communication with (connected with) the spring loaded pins 234*b*.

The third dongle 206*c* can include a third external port 230*c*, a third connector pad 232*c*, a third additional connector pad 233*c*, and a third plurality of spring loaded pins 234*c*. The third external port 230*c* is positioned on a first side 240*c* of the third dongle 206*c*; the second connector pad 232*b* is positioned on a second side 242*c* of the third dongle 206*c*; the third plurality of spring loaded pins 234*c* are positioned on a third side 244*c* of the third dongle 206*c*; and the third additional connector pad 233*c* is positioned on a fourth side 246*c* of the third dongle 206*c*. The third connector pad 232*c* can be in communication with (connected with) the third additional connector pad 233*c*, the third external port 230*c*, and the third plurality of spring loaded pins 234*c*. The third external port 230*c* can be in communication with (connected with) the third additional connector pad 233*c*. The third external port 230*b* can be in communication with (connected with) the spring loaded pins 234*c*.

The external ports 230*a*, 230*b*, 230*c* can collectively be referred to as external ports 230. The connector pads 232*a*, 232*b*, 232*c* can collectively be referred to as connector pads 232. The additional connector pads 233*a*, 233*b*, 233*c* can collectively be referred to as additional connector pads 233. The spring loaded pins 234*a*, 234*b*, 234*c* can collectively be referred to as spring loaded pins 234. The first sides 240*a*, 240*b*, 240*c* can collectively be referred to as first sides 240. The second sides 242*a*, 242*b*, 242*c* can collectively be referred to as second sides 242. The third sides 244*a*, 244*b*, 244*c* can collectively be referred to as third sides 244. The fourth sides 246*a*, 246*b*, 246*c* can collectively be referred to as fourth sides 246.

The first dongle 206*a* can be coupled with (or connected with) the junction connector 204. Specifically, the connector pad 232*a* of the first dongle 206*a* can be coupled with (or connected with) the spring loaded pins 220 of the junction connector 204.

The first dongle 206*a* can be coupled with (or connected with) the second dongle 206*b*. Specifically, the spring loaded pins 234*a* of the first dongle 206*a* can be coupled with (or connected with) the second additional connector pad 233*b* of the second dongle 206*b*.

The first dongle 206*a* can be coupled with (or connected with) the third dongle 206*c*. Specifically, the first additional connector pad 233*a* of the first dongle 206*a* can be coupled with (or connected with) the spring loaded pins 234*c* of the third dongle 206*c*.

The junction connector 204 can further be coupled with (or connected with) the information handling system 202. Specifically, the circuit board connector 222 of the junction connector 204 can be coupled with (or connected with) the socket 210 of the information handling system 202.

In some examples, the external ports 230 can include a high-definition multimedia interface (HDMI) port, an universal serial bus (USB) port, and/or a secure digital (SD) port.

In some examples, the socket 210 can include a zero insertion forced (ZIF) socket.

Figure 3A:
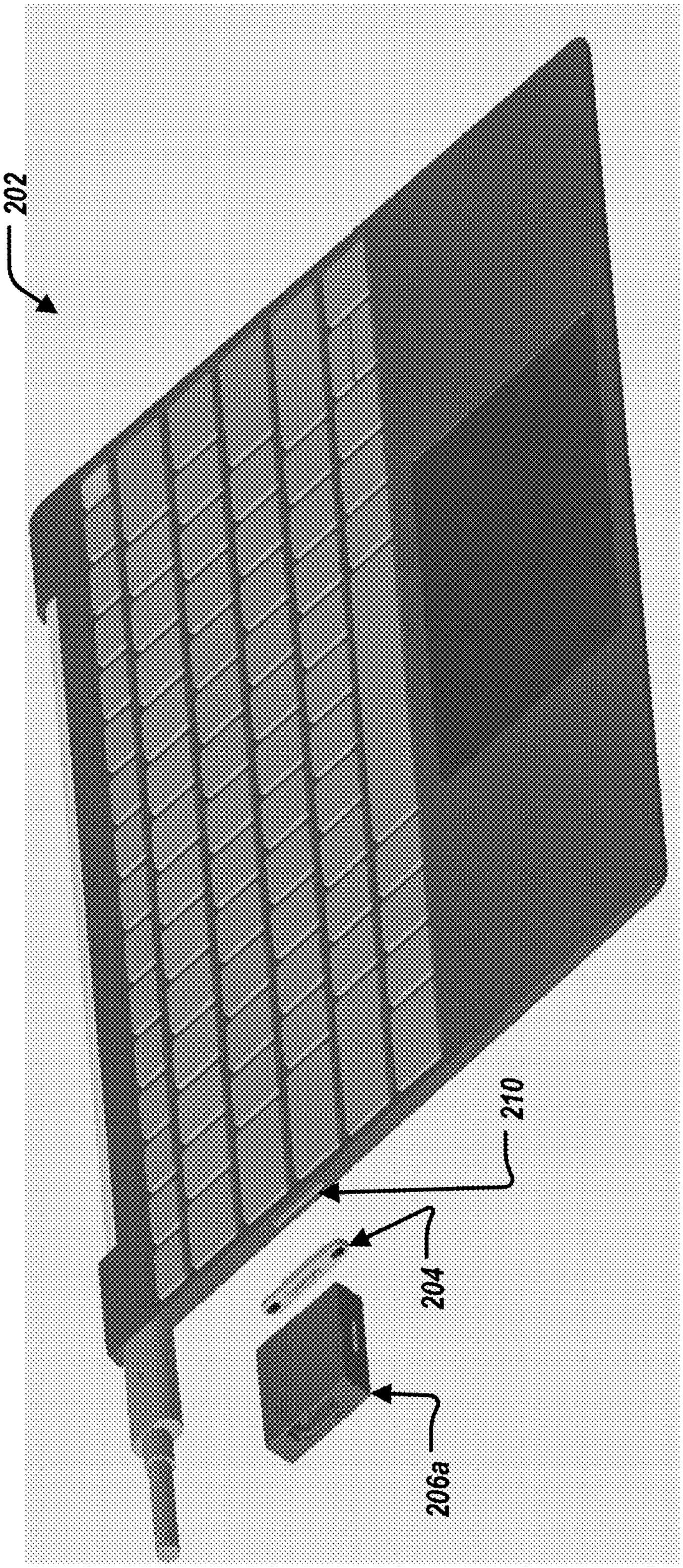
FIG. 3A illustrates a perspective view of the junction connector, a first dongle, and the information handling system decoupled from one another.
Figure 3B:
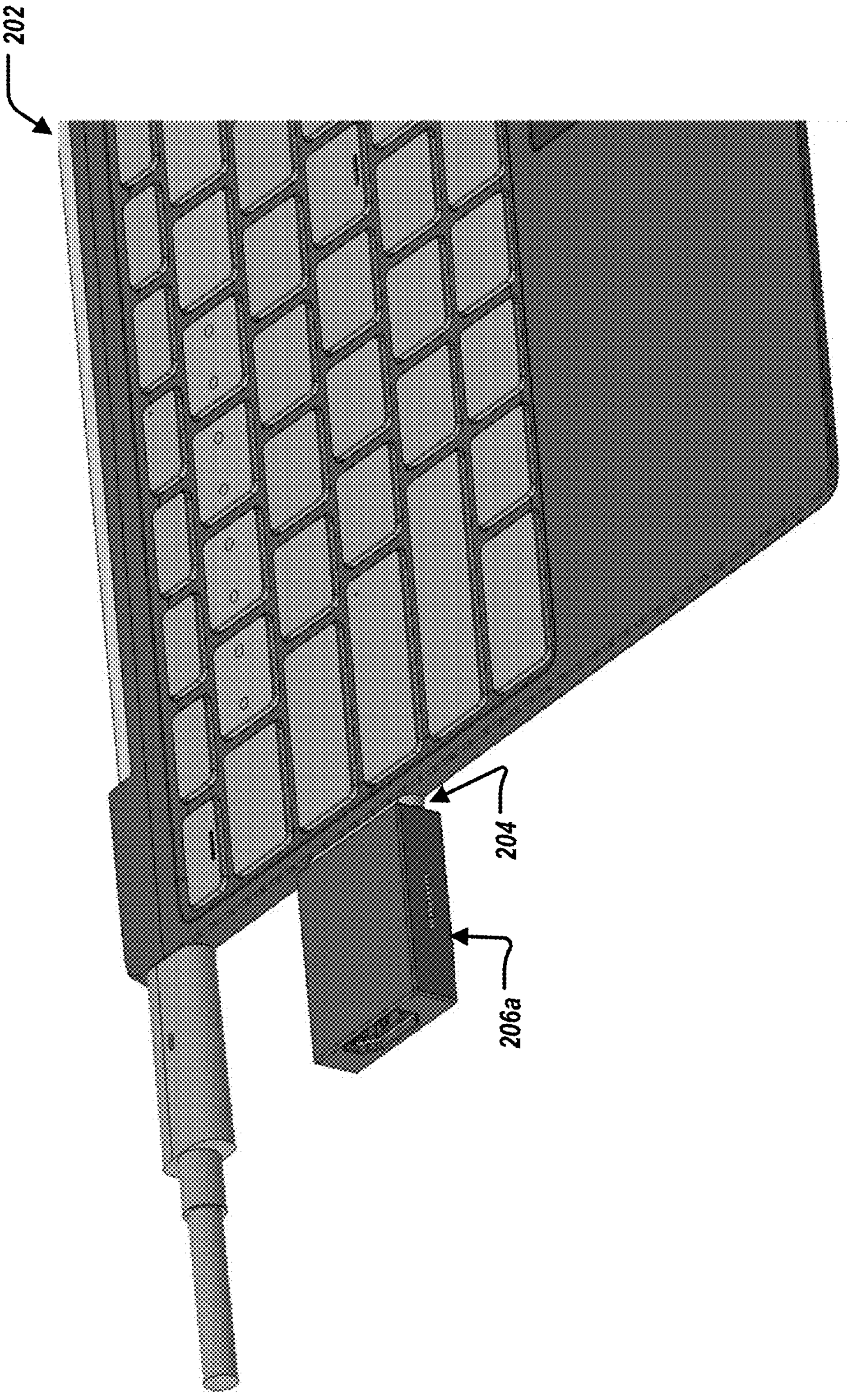
FIG. 3B illustrates a perspective view of the junction connector, the first dongle, and the information handling system coupled together.

FIG. 3A illustrates a perspective view of the junction connector 204, the first dongle 206*a*, and the information handling system 202 decoupled from one another. FIG. 3B illustrates a perspective view of the junction connector 204, the first dongle 206*a*, and the information handling system 202 coupled together, described further herein.

Figure 4A:
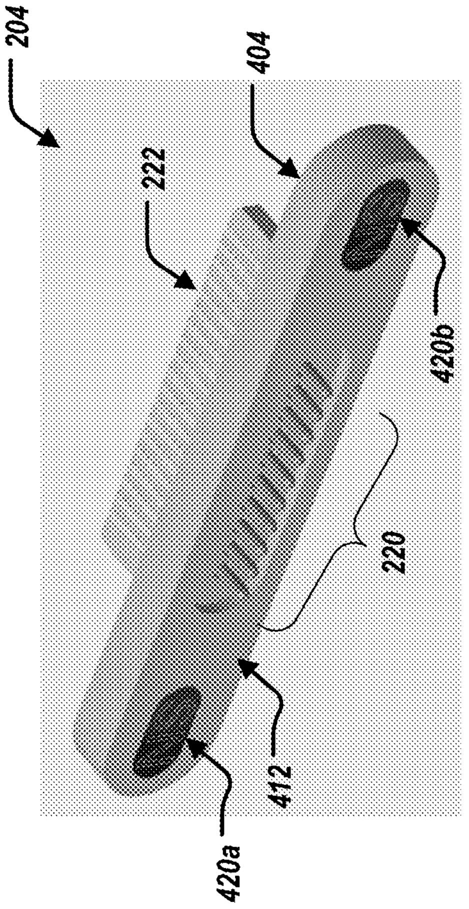
FIGS. 4A, 4B illustrate respective perspective views of the junction connector.
Figure 4B:
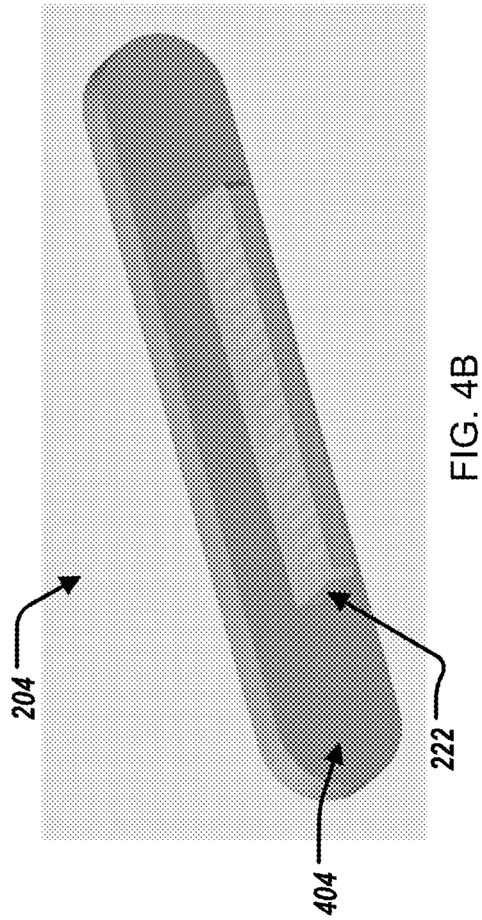

FIGS. 4A, 4B illustrate respective perspective views of the junction connector 204. The junction connector 204 can include the circuit board connector 222 positioned on a first side 404 of the junction connector 204. In some examples, the circuit board connector 222 is a gold finger connector for signal interface. In some examples, the circuit board connector 222 is a ZIF connector.

The junction connector 204 can further include a plurality of spring loaded pins 220 positioned on a second side 412 of the junction connector 204. The second side 412 of the junction connector 204 is opposite to the first side 410 of the junction connector 204. For example, the spring loaded pins 220 can include pogo pins for signal interface.

The circuit board connector 222 can be connected to the plurality of spring loaded pins 220. That is, the circuit board connector 222 can be in communication with the spring loaded pins 220 such that signals can be transferred/transmitted between the circuit board connector 222 and the spring loaded pins 220.

The junction connector 204 further includes a first magnetic coupling interface 420*a*, 420*b* (collectively referred to as first magnetic coupling interface 420) at the second side 412 of the junction connector 204.

Figure 5A:
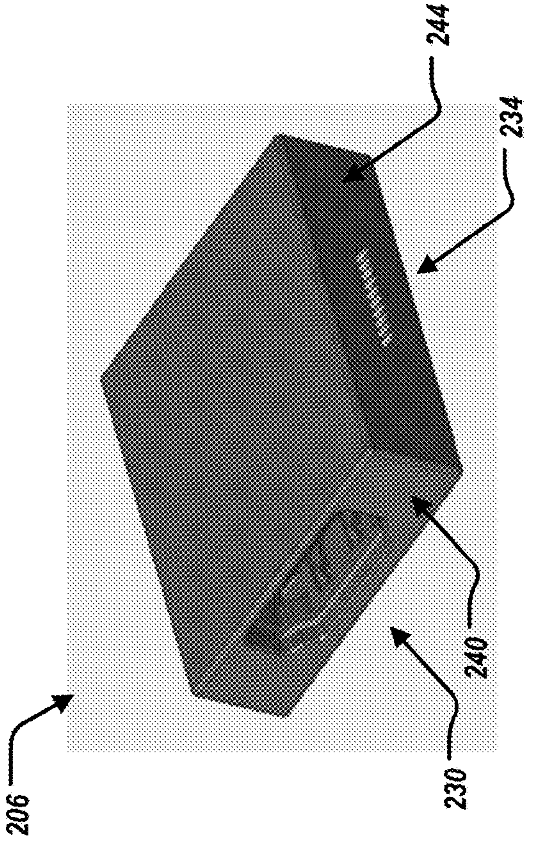
FIGS. 5A, 5B, 5C illustrate respective perspective views of the dongle.
Figure 5B:
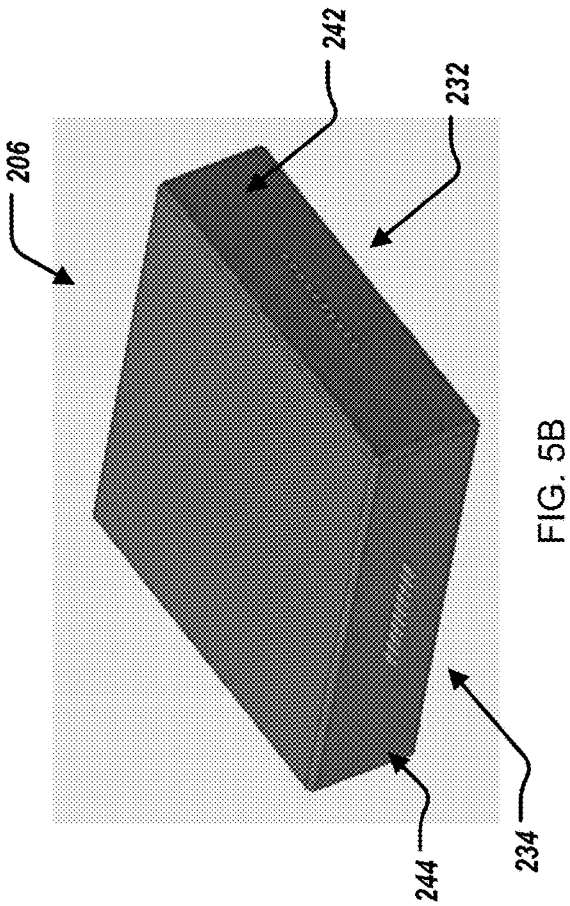
Figure 5C:
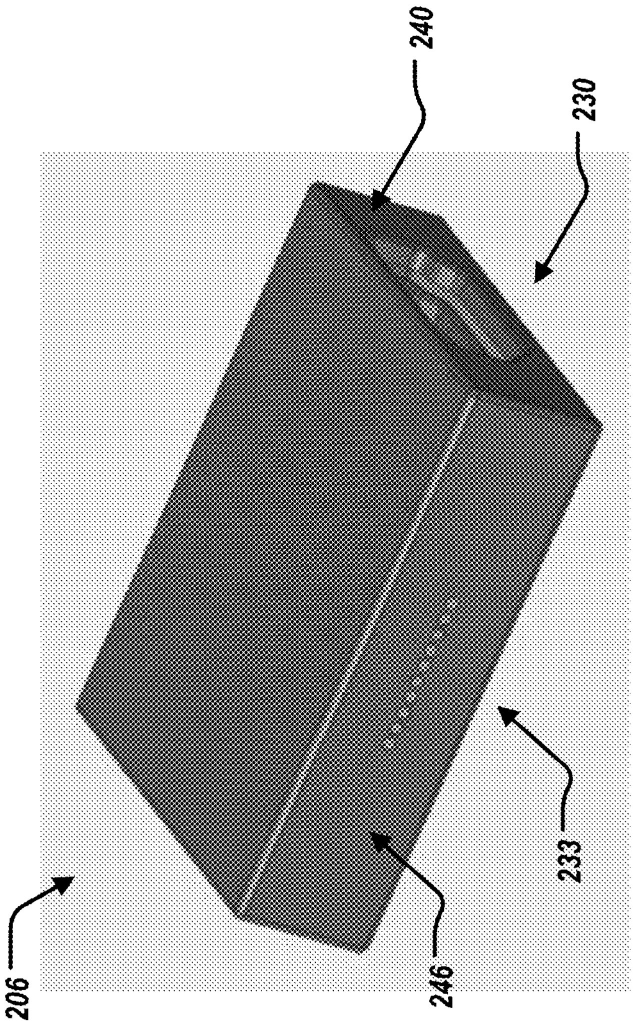
Figure 6:
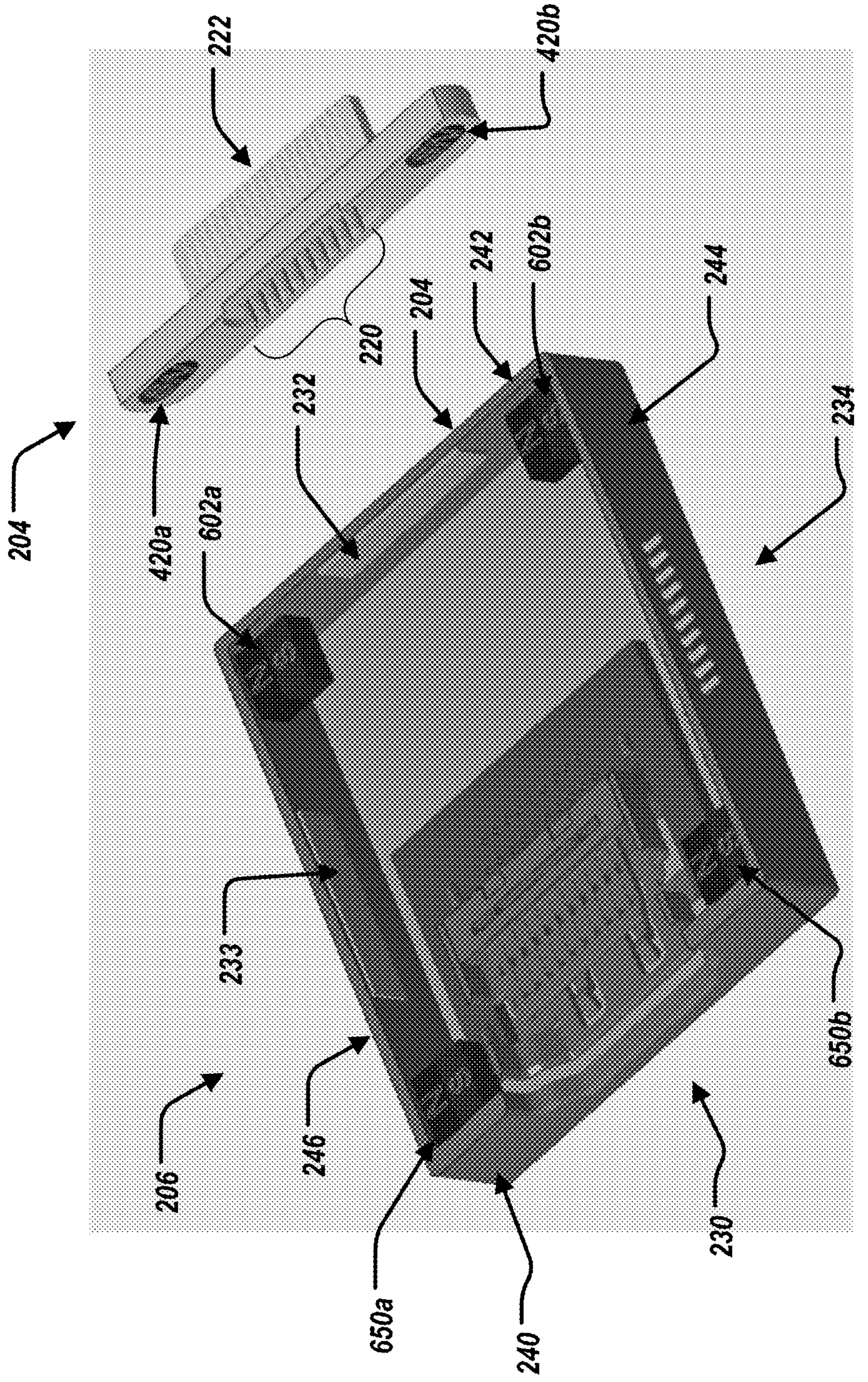
FIG. 6 illustrates a cutaway view of the dongle proximate to the junction connector.

FIGS. 5A, 5B, 5C illustrate respective perspective views of the dongle 206. FIG. 6 illustrates a cutaway view of the dongle 206 proximate to the junction connector 204. Referring to FIGS. 5A, 5B, 5C and 6, the dongle 206 can include the external port 230 position on the first side 240 of the dongle 206. The dongle 206 can include the connector pad 232 positioned on the second side 242 of the dongle 206. The external port 230 is connected to the connector pad 232. That is, the external port 230 can be in communication with the connector pad 232 such that signals can be transferred/transmitted between the external port 230 and the connector pad 232.

The dongle 206 can further include the plurality of spring loaded pins 234 positioned on the third side 244 of the dongle 206. The spring loaded pins 234 can be connected to the connector pad 232. That is, the spring loaded pins 234 can be in communication with the connector pad 232 such that signals can be transferred/transmitted between the spring loaded pins 234 and the connector pad 232.

The dongle 206 can further include the additional connector pad 233 positioned on the fourth side 246 of the dongle 206. The additional connector pad 233 can be connected to the connector pad 232. That is, the additional connector pad 233 can be in communication with the connector pad 232 such that signals can be transferred/transmitted between the additional connector pad 232 and the connector pad 232.

Further, the external port 230 is connected to the additional connector pad 233. That is, the external port 230 can be in communication with the additional connector pad 233 such that signals can be transferred/transmitted between the external port 230 and the additional connector pad 233.

Further, the external port 230 is connected to the spring loaded pins 234. That is, the external port 230 can be in communication with the spring loaded pins 234 such that signals can be transferred/transmitted between the external port 230 and the spring loaded pins 234.

The dongle 206 can further include a second magnetic coupling interface 602*a*, 602*b* (collectively referred to as second magnetic coupling interface 602). The second magnetic coupling interface 602 can be positioned at the second side 242 of the dongle 206. Further, the second magnetic coupling interface 602*b* can be positioned along the third side 244 of the dongle 206 as well. That is, the second magnetic coupling interface 602*b* is positioned at the junction (corner) of the second side 242 and the third side 244 of the dongle 206. Moreover, the second magnetic coupling interface 602*a* can be positioned along the fourth side 246 of the dongle 206 as well. That is, the second magnetic coupling interface 602*a* is positioned at the junction (corner) of the second side 242 and the fourth side 246 of the dongle 206.

The dongle 206 can further include a third magnetic coupling interface 650*a*, 650*b* (collectively referred to as third magnetic coupling interface 650). The third magnetic coupling interface 650 can be positioned at the first side 240 of the dongle 206. Further, the third magnetic coupling interface 650*b* can be positioned along the third side 244 of the dongle 206 as well. That is, the third magnetic coupling interface 650*b* is positioned at the junction (corner) of the first side 240 and the third side 244 of the dongle 206. Moreover, the third magnetic coupling interface 650*a* can be positioned along the fourth side 246 of the dongle 206 as well. That is, the third magnetic coupling interface 650*a* is positioned at the junction (corner) of the first side 240 and the fourth side 246 of the dongle 206.

Referring to FIGS. 3B and 6, the first dongle 206*a* is coupled to the junction connector 204. Specifically, the first dongle 206*a* is coupled to the junction connector 204 such that the first connector pad 232*a* of the first dongle 206*a* is connected to the plurality of spring loaded pins 220 of the junction connector 204. That is, the first connector pad 232*a* of the first dongle 206*a* can be in communication with the spring loaded pins 220 of the junction conner 204 such that signals can be transferred/transmitted between the first connector pad 232*a* and the spring loaded pins 220. Furthermore, as the first external port 230*a* is connected to the connector pad 232*a* and the circuit board connector 222*a* is connected to the plurality of spring loaded pins 220*a*, the first external port 230*a* of the first dongle 206*a* is connected with the circuit board connector 222 of the junction connector 204.

Moreover, when the first dongle 206*a* is coupled to the junction connector 204, the first magnetic coupling interface 420 of the junction connector 204 is coupled with the second magnetic coupling interface 602 of the first dongle 206*a*. That is, the first magnetic coupling interface 420*a* of the junction connector 204 is magnetically coupled with the second magnetic coupling interface 602*a* of the first dongle 206*a*; and the second magnetic coupling interface 420*b* of the junction connector 204 is magnetically coupled with the second magnetic coupling interface 602*b* of the first dongle 206*a*. The first magnetic coupling interface 420 of the junction connector 204 is coupled with the second magnetic coupling interface 602 of the first dongle 206*a* to facilitate or maintain a positioning of the first dongle 206*a* with respect to the junction connector 204.

The junction connector 204 is coupled with the socket 210 of the information handling system 202. Specifically, the junction connector 204 is coupled with the socket 210 of the information handling system 202 such that the circuit board connector 222 of the junction connector 204 is connected to the socket 210. That is, the circuit board connector 222 of the junction connector 204 can be in communication with the socket 210 of the information handling system 202 such that signals can be transferred/transmitted between the circuit board connector 222 and the socket 210. Furthermore, as the first external port 230*a* is connected with the circuit board connector 222*a* of the junction connector 204, the first external port 230*a* of the first dongle 206*a* is ultimately connected with the socket 210 of the information handling system 202.

Moreover, the information handling system 202 can further include a fourth magnetic coupling interface (not shown) proximate to the socket 210. When the junction connector 204 is coupled to the socket 210, the first magnetic coupling interface 420 of the junction connector 204 is coupled with the fourth magnetic coupling interface of the information handling system 202. The first magnetic coupling interface 420 of the junction connector 204 is coupled with the fourth magnetic coupling interface of the information handling system 202 to facilitate or maintain a positioning of the junction connector 204 with respect to the information handling system 202.

Figure 7:
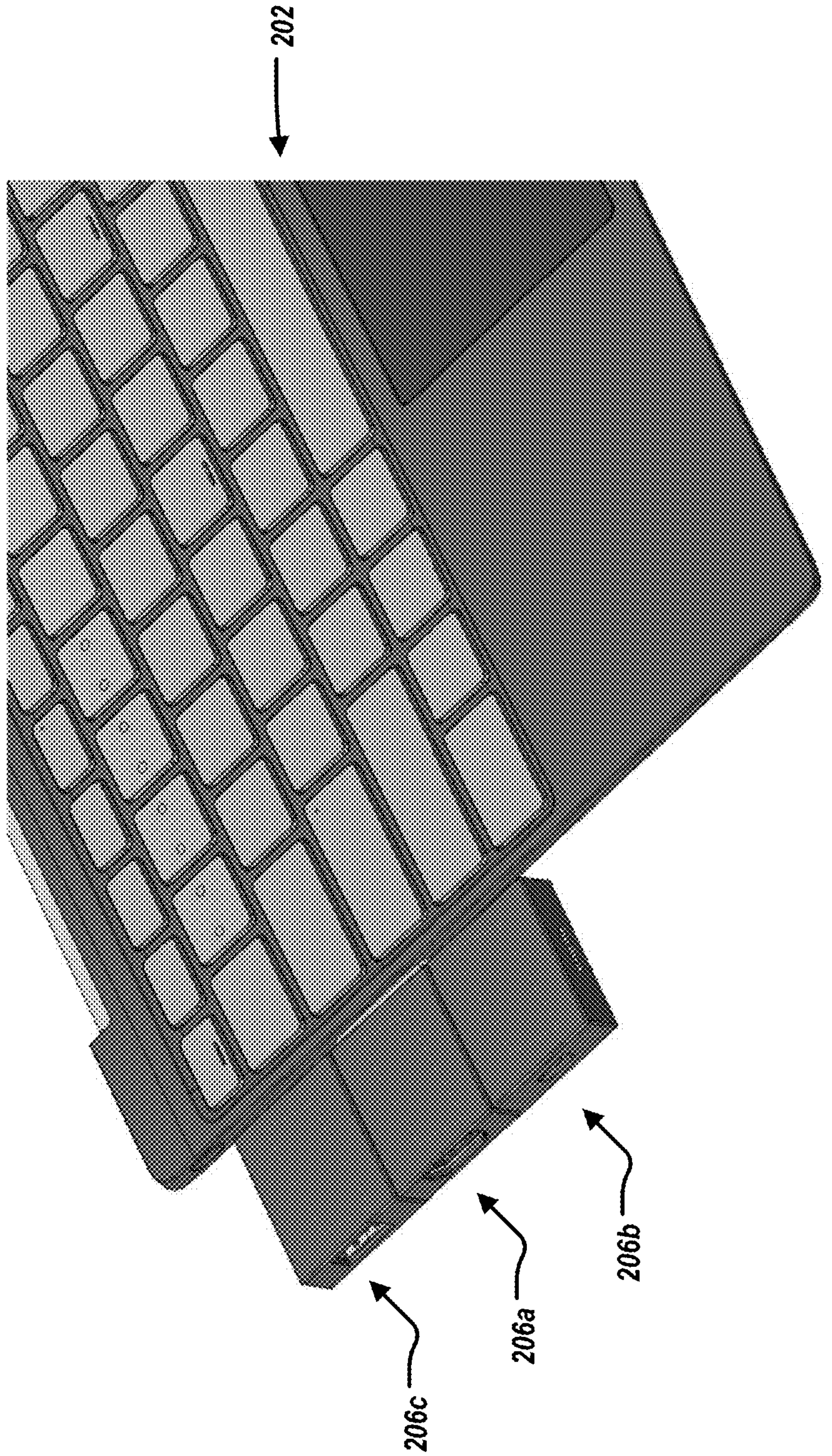
FIG. 7 illustrates a second dongle and a third dongle each coupled with the first dongle.

FIG. 7 illustrates the second dongle 206*b* and the third dongle 206*c* each coupled with the first dongle 206*a*. Referring to FIGS. 6 and 7, specifically, the second dongle 206*b* is coupled to the first dongle 206*a* such that the additional second connector pad 233*b* of the second dongle 206*b* is connected to the plurality of spring loaded pins 234*a* of the first dongle 206*a*. That is, the spring loaded pins 234*a* of the first dongle 206*a* can be in communication with the additional second connector pad 233*b* of the second dongle 206*b* such that signals can be transferred/transmitted between the additional second connector pad 233*b* and the spring loaded pins 234*a*. Furthermore, as the second external port 230*b* is connected to the second additional connector pad 233*b*, and the second additional connector pad 233*b* is connected to the spring loaded pins 234*a*, and the spring loaded pins 234*a* are connected to the first connector pad 232*a*, the second external port 230*b* of the second dongle 206*b* is connected with the first connector pad 232*a* of the first dongle 206*a*. Further, as the first connector pad 232*a* of the first dongle 260*a* is connected to the spring loaded pins 220 of the junction connector 204, and the spring loaded pins 220 are connected to the circuit board connector 222, the second external port 230*b* of the second dongle 206*b* is connected with the circuit board connector 222 of the junction connector 204. Furthermore, as the second external port 230*b* is connected with the circuit board connector 222*a* of the junction connector 204, the second external port 230*b* of the second dongle 206*b* is ultimately connected with the socket 210 of the information handling system 202. Moreover, when the second dongle 206*b* is coupled to the first dongle 206*a*, the second magnetic coupling interface 602*b* of the first dongle 206*a* is magnetically coupled with the second magnetic coupling interface 602*a* of the second dongle 206*b*; and the third magnetic coupling interface 650*b* of the first dongle 206*a* is magnetically coupled with the third magnetic coupling interface 650*a* of the second dongle 206*b* to facilitate or maintain a positioning of the second dongle 206*b* with respect to the first dongle 206*a*.

Further, the third dongle 206*c* is coupled to the first dongle 206*a* such that the plurality of spring load pins 234*c* of the third dongle 206*c* is connected to the additional connector pad 233*a* of the first dongle 206*a*. That is, the additional connector pad 233*a* of the first dongle 206*a* can be in communication with the spring loaded pins 234*c* of the third dongle 206*c* such that signals can be transferred/transmitted between the additional second connector pad 233*a* and the spring loaded pins 234*c*. Furthermore, as the third external port 230*c* is connected to the spring loaded pin 234*c*, and the spring loaded pins 234*c* are connected to the first additional connector pad 233*a*, and the first additional connector pad 233*a* is connected to the first connector pad 232*a*, the third external port 230*c* of the third dongle 230*c* is connected with the first connector pad 232*a* of the first dongle 206*a*. Further, as the first connector pad 232*a* of the first dongle 260*a* is connected to the spring loaded pins 220 of the junction connector 204, and the spring loaded pins 220 are connected to the circuit board connector 222, the third external port 230*c* of the third dongle 206*c* is connected with the circuit board connector 222 of the junction connector 204. Furthermore, as the third external port 230*c* is connected with the circuit board connector 222*a* of the junction connector 204, the third external port 230*c* of the third dongle 206*c* is ultimately connected with the socket 210 of the information handling system 202. Moreover, when the third dongle 206*c* is coupled to the first dongle 206*a*, the first magnetic coupling interface 602*a* of the first dongle 206*a* is magnetically coupled with the second magnetic coupling interface 602*b* of the third dongle 206*c*; and the third magnetic coupling interface 650*a* of the first dongle 206*a* is magnetically coupled with the third magnetic coupling interface 650*b* of the third dongle 206*c* to facilitate or maintain a positioning of the third dongle 206*c* with respect to the first dongle 206*a*.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An assembly, comprising:

a junction connector, including:

a circuit board connector positioned on a first side of the junction connector;

a plurality of spring loaded pins positioned on a second side of the junction connector, the second side opposite to the first side, wherein the circuit board connector is connected to the plurality of spring loaded pins;

a dongle, including:

an external port positioned on a first side of the dongle;

a connector pad positioned on a second side of the dongle; and a plurality of spring loaded pins positioned on a third side of the dongle, the plurality of spring loaded pins of the dongle connected to the connector pad of the dongle, wherein the external port is connected to the connector pad, wherein the dongle is coupled to the junction connector such that the connector pad of the dongle is connected to the plurality of spring loaded pins of the junction connector, wherein the circuit board connector of the junction connector is configured to be coupled with a socket of an information handling system.

2. The assembly of claim 1, wherein the junction connector includes a first magnetic coupling interface at the second side of the junction connector; and the dongle includes a second magnetic coupling interface at the second side of the dongle, wherein the dongle is coupled to the junction connector such that the first magnetic coupling interface of the junction connector is coupled with the second magnetic coupling interface of the dongle.

3. The assembly of claim 2, wherein the first magnetic coupling interface of the junction connector is coupled with the second magnetic coupling interface of the dongle to maintain a positioning of the dongle with respect to the junction connector.

4. The assembly of claim 1, further including:

an additional dongle, including:

an additional external port positioned on a first side of the additional dongle; and an additional connector pad positioned on a fourth side of the additional dongle, wherein the additional external port is connected to the additional connector pad.

5. The assembly of claim 4, wherein the additional dongle is coupled to the dongle such that the additional connector pad of the additional dongle is connected to the plurality of spring loaded pins of the dongle.

6. The assembly of claim 5, wherein the dongle includes a third magnetic coupling interface positioned on the third side of the dongle; and the additional dongle includes a fourth magnetic coupling interface positioned on the fourth side of the additional dongle, wherein the additional dongle is coupled to the dongle such that the third magnetic coupling interface of the dongle is coupled with the fourth magnetic coupling interface of the additional dongle.

7. The assembly of claim 1, wherein the dongle includes an additional connector pad positioned on a fourth side of the dongle, the additional connector pad of the dongle connected to the connector pad of the dongle.

8. The assembly of claim 7, further including:

an additional dongle, including:

an additional external port positioned on a first side of the additional dongle; and an additional plurality of spring loaded pins positioned on a third side of the additional dongle, wherein the additional external port is connected to the additional plurality of spring loaded pins.

9. The assembly of claim 8, wherein the additional dongle is coupled to the dongle such that the additional plurality of spring loaded pins of the additional dongle is connected to the additional connector pad of the dongle.

10. The assembly of claim 9, wherein the dongle includes a fifth magnetic coupling interface positioned on the fourth side of the dongle; and the additional dongle includes a sixth magnetic coupling interface positioned on the third side of the additional dongle, wherein the additional dongle is coupled to the dongle such that the fifth magnetic coupling interface of the dongle is coupled with the sixth magnetic coupling interface of the additional dongle.

11. The assembly of claim 9, wherein the external port of the dongle is a high-definition multimedia interface (HDMI) port.

12. The assembly of claim 9, wherein the external port of the dongle is an universal serial bus (USB) port.

13. The assembly of claim 9, wherein the external port of the dongle is a secure digital (SD) port.

14. The assembly of claim 9, wherein the socket of the information handling system is a zero insertion force (ZIF) socket.

15. An assembly, comprising:

a junction connector, including:

a circuit board connector positioned on a first side of the junction connector;

a first plurality of spring loaded pins positioned on a second side of the junction connector, the second side opposite to the first side, wherein the circuit board connector is connected to the plurality of spring loaded pins;

a first dongle, including:

a first external port positioned on a first side of the first dongle; and a first connector pad positioned on a second side of the first dongle;

a second plurality of spring loaded pins on a third side of first dongle;

wherein the first external port is connected to the first connector pad, wherein the second plurality of spring loaded pins is connected to the first connector pad, a second dongle, including:

a second external port positioned on a first side of the second dongle; and a second connector pad positioned on a fourth side of the second dongle, wherein the second external port is connected to the second connector pad, wherein the second dongle is coupled to the first dongle such that the second connector pad of the second dongle is connected to the second plurality of spring loaded pins of the first dongle, wherein the first dongle is coupled to the junction connector such that the first connector pad of the first dongle is connected to the first plurality of spring loaded pins of the junction connector.

16. The assembly of claim 15, wherein the circuit board connector of the junction connector is configured to be coupled with a socket of an information handling system.

17. The assembly of claim 15, wherein the junction connector includes a first magnetic coupling interface at the second side of the junction connector; and the first dongle includes a second magnetic coupling interface at the second side of the first dongle, wherein the first dongle is coupled to the junction connector such that the first magnetic coupling interface of the junction connector is coupled with the second magnetic coupling interface of the first dongle.

18. The assembly of claim 17, wherein the first magnetic coupling interface of the junction connector is coupled with the second magnetic coupling interface of the first dongle to maintain a positioning of the first dongle with respect to the junction connector.

19. The assembly of claim 15, wherein the first dongle includes an additional connector pad positioned on a fourth side of the first dongle, the additional connector pad of the first dongle connected to the connector pad of the first dongle.

* * * * *